Sept. 1, 1964  B. D. HENDERSON  3,146,460
SEGMENT SAFETY DEVICE
Filed Sept. 14, 1962  2 Sheets-Sheet 1
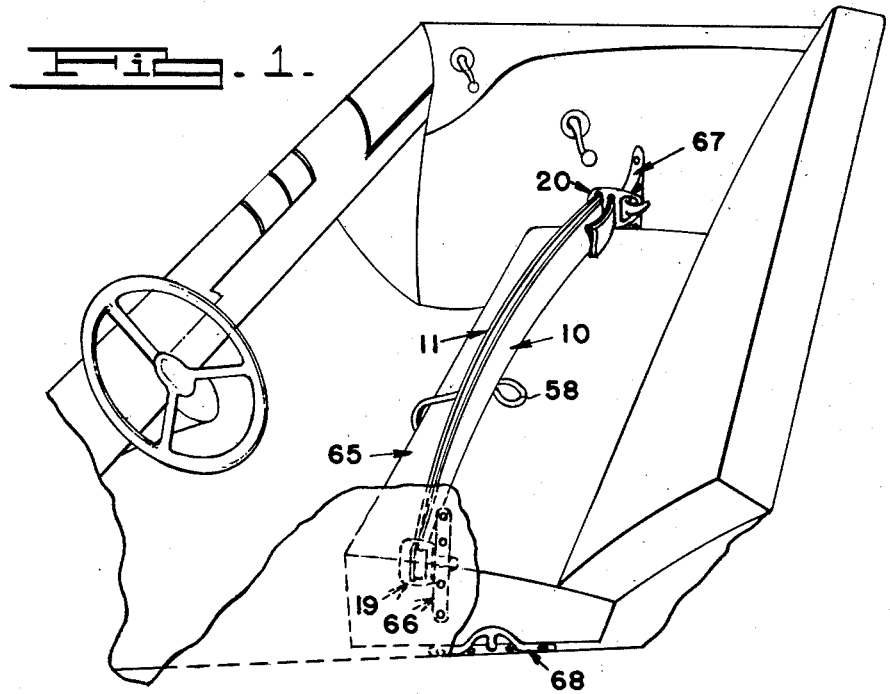
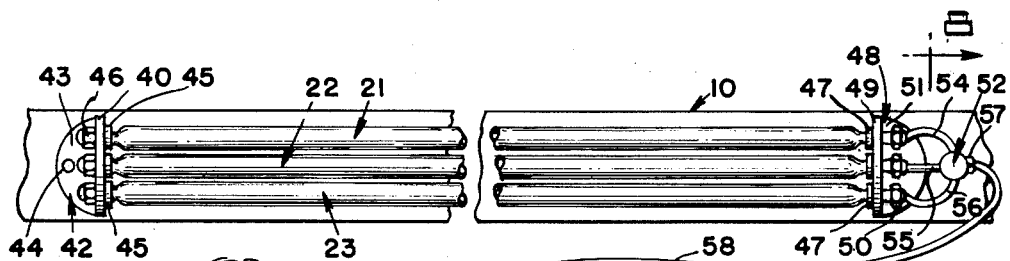
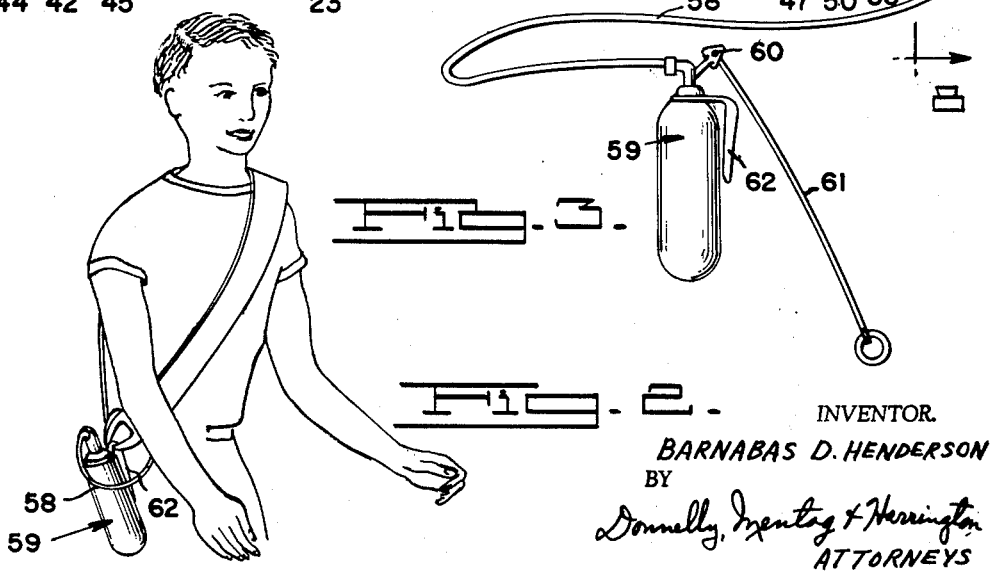
INVENTOR.
BARNABAS D. HENDERSON
BY
Donnelly, Mentag & Herrington
ATTORNEYS Sept. 1, 1964
B. D. HENDERSON
3,146,460
SEGMENT SAFETY DEVICE
Filed Sept. 14, 1962
2 Sheets-Sheet 2
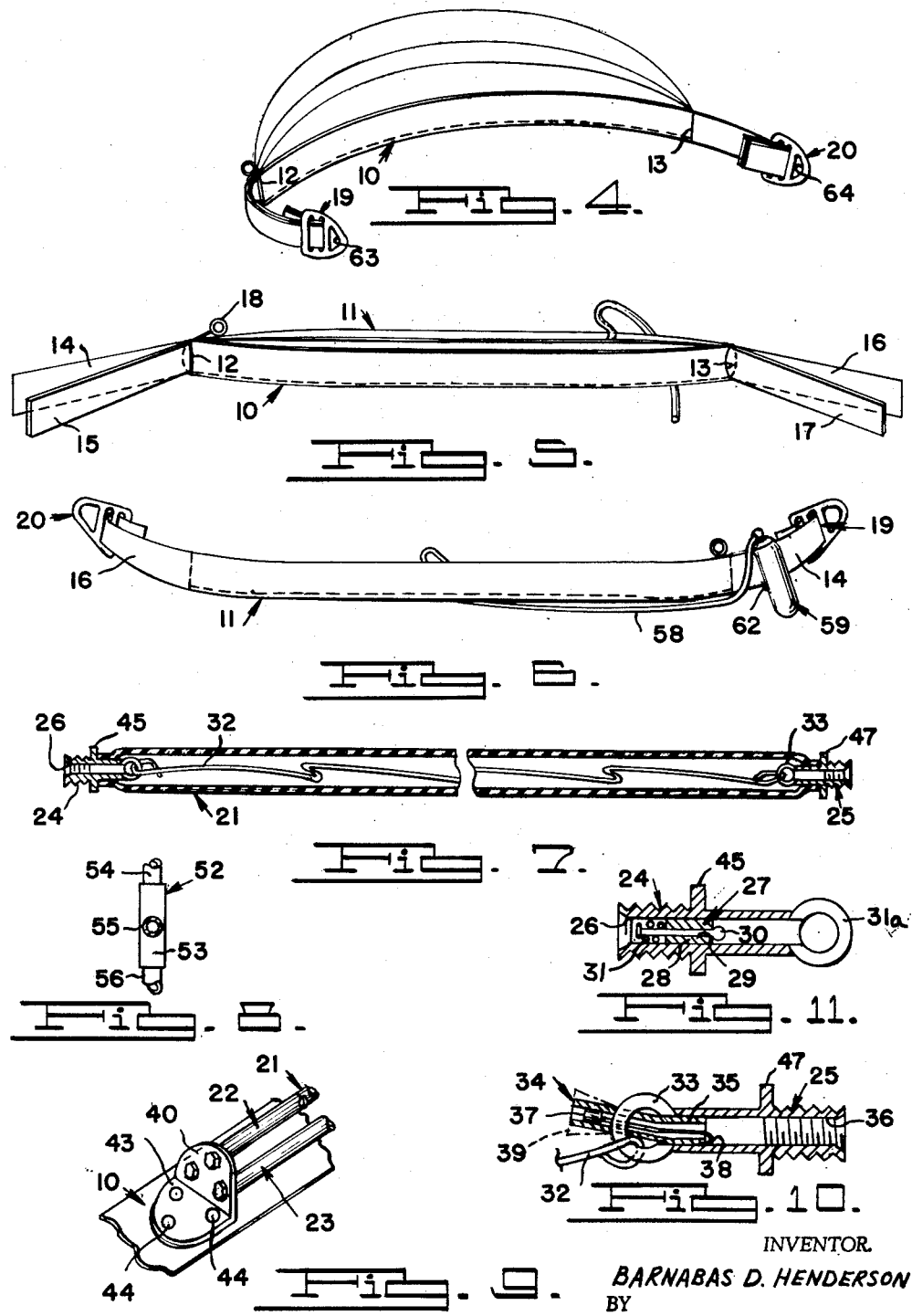
INVENTOR.
BARNABAS D. HENDERSON
BY
Donnelly, Mentag & Harrington
ATTORNEYS United States Patent Office 3,146,460
Patented Sept. 1, 1964

3,146,460
SEGMENT SAFETY DEVICE
Barnabas D. Henderson, 18926 Fleming, Detroit, Mich.
Filed Sept. 14, 1962, Ser. No. 223,694
5 Claims. (Cl. 2—2)

This invention relates generally to safety equipment, and more particularly, to a segment safety device having an inflatable collision means and adapted for use in preventing injuries to occupants of automobiles, trucks, boats, and the like.

In automobile, boat and other accidents, many injuries are caused by coming into contact with the steering wheel, windshield, dashboard and the like. Accordingly, it is the primary object of the present invention to provide a segment safety device which is adapted to provide quickly inflatable means for protecting an occupant of the vehicle, such as an automobile, against injury from contact with the aforementioned parts of a vehicle.

It is another object of the present invention to provide a segment safety device which is adapted to prevent the occupants of a vehicle seat from being thrown from the vehicle in case of a collision or similar accident while simultaneously providing a cushioned inflatable means whereby the occupants of the seat are further protected against injury from contacting the steering wheel, windshield and the like.

It is still another object of the present invention to provide a segment safety device having a plurality of inflatable cushioning means and which is simple and compact in construction, economical of manufacture, easy to use and efficient in operation.

It is a still further object of the present invention to provide a segment safety device including a belt having attachment buckles for buckling the belt around the body of a person or across the seat of an automobile, a plurality of inflatable cushioning members on the outer side of the belt, means for inflating the cushioning members, and a cover means for enclosing the inflatable cushioning members when the safety device is not in use.

Other objects, features and advantages of this invention will be apparent from the following detailed description, appended claims and the accompanying drawings.

In the drawings:

FIG. 1 is a fragmentary perspective view of an automobile front seat, and showing the segment safety device of the present invention installed in place for operating as a combination safety belt and collision shield for an occupant of an automobile seat;

FIG. 2 is a fragmentary view of a person and showing the use of the segment safety device of the present invention when carried on the body of a person;

FIG. 3 is a fragmentary, broken, elevational view of a part of the segment safety device of the present invention, and showing the inflatable segments of the safety device;

FIG. 4 is a perspective rear elevational view of the segment safety device of the present invention, and showing the expandable segments partially inflated;

FIG. 5 is a rear elevational view of the safety device shown in FIG. 4, and showing the attachment buckles removed;

FIG. 6 is a front elevational view of the structure illustrated in FIG. 5, and showing the attachment buckles and a carbon dioxide supply cylinder;

FIG. 7 is a broken, longitudinal, sectional view of one of the inflatable safety segments employed in the safety device of the present invention;

FIG. 8 is a fragmentary, elevational view of the master cylinder structure illustrated in FIG. 3, taken along the line 8—8 thereof and looking in the direction of the arrows;

FIG. 9 is a fragmentary perspective view of the left end of the segment safety device structure illustrated in FIG. 3;

FIG. 10 is an enlarged sectional view of the right end air chuck used in the structure illustrated in FIG. 7; and FIG. 11 is an enlarged sectional view of the left end air chuck used in the structure illustrated in FIG. 7.

Referring now to the drawings, and in particular to FIGS. 1 and 5, the segment safety device of the present invention is shown as comprising a belt having a pair of elongated strips of material which are generally indicated by the numerals 10 and 11. The strips of material 10 and 11 are secured together along the bottom edges thereof by any suitable means as by stitching between the points indicated by the numerals 12 and 13. The upper edges of the strips 10 and 11 are adapted to be releasably secured together between the points 12 and 13 by a conventional zipper means 18. The left ends of the belt beyond the point 12 are indicated by the numerals 14 and 15 and they are adapted to be operatively connected to a suitable conventional belt buckle 19. The right ends 16 and 17 of the strips 10 and 11 are adapted to be similarly connected to a conventional safety belt buckle generally indicated by the numeral 20.

As shown in FIG. 3, the rear strip of material 10 is provided on the front side thereof with a plurality of expandable, inflatable elongated segments indicated by the numerals 21, 22 and 23. The inner or rear strip of material 10 is preferably made from a strong material and provides the strength portion of the belt. The strip 10 is made from any suitable material used in conventional safety belts, as for example, it may be made from a nylon web material. The front or outer strip 11 may be made from any suitable material as for example, a rayon cloth material. The inflatable safety segments 21, 22 and 23 may be made from any suitable inflatable material as for example, a suitable rubber material.

Each of the inflatable elements 21, 22 and 23 are constructed the same and the construction of one of these elements is shown in FIGS. 7, 10 and 11 to illustrate the common construction. As shown in FIG. 7, each end of the inflatable member 21 is open and receives an air chuck indicated by the numerals 24 and 25. The air chucks 24 and 25 are similarly constructed. As shown in FIG. 7, the air chuck 24 comprises a tubular body having the passage 26 formed therethrough and which is threaded in the outer end thereof for reception of a conventional standard valve core as shown in FIG. 11. The standard valve core is indicated by the numeral 27 and includes the usual body 28 and passage 29 therethrough which is normally closed by means of the valve 30. The spring 31 normally biases the valve 30 to a closed position. The inner end of the air chuck 24 is provided with the attachment ring 31a to which is fixedly secured one end of a nylon rope 32. The other end of the nylon rope 32 is secured to a similar retaining ring 33 formed on the inner end of the air chuck 25. The nylon rope 32 is longer than the inflatable member 21 when the inflatable member 21 is in the relaxed position shown in FIG. 7. The length of the nylon rope is determined by the length to which the member 21 will be inflated in an operative position. The nylon rope 32 functions as a further safety device and lends strength to the inflatable member 21 when it engages a dashboard or the like.

The means for inflating the segment 21, as for example, carbon dioxide, is inserted through the chuck 25. The chuck 25 is provided with any suitable inlet valve means. The valve means for the chuck 25 is indicated by the numeral 34 and the valve means shown comprises the rubber tube or bladder 35 which has the outer end thereof vulcanized in the passageway 36 formed through the chuck 25. Mounted in the inner end of the tube 35 is a metal or plastic cork or plug 37 which is secured by means of a line 38 in position in the inner end of the tube or bladder 35. The outer end of the line 38 may be turned over the outer end of the bladder 35 and secured between the bladder 35 and the surface of the passageway 36. It will be seen that when carbon dioxide or compressed air is inserted into the passageway 36, the inner end of the expandable bladder 35 will be expanded to the dotted line position shown by the numeral 39 to permit the carbon dioxide or compressed air to pass by the plug or cork 37 to inflate the segment 21. As shown in FIG. 3, the left ends of the segments 21, 22 and 23 are secured to the outwardly extended flange 40 of the retainer bracket 42. The retainer bracket 42 has a second flange 43 disposed at right angles to the flange 40 and secured to the belt by any suitable means, as by the rivets 44.

As shown in FIGS. 3 and 7, the left ends of the segments 21, 22 and 23 are vulcanized or otherwise suitably secured to their respective left end air chucks 24. The air chucks 24 are provided with the integral flange 45 which abuts against the bracket flange 40. The outer ends of the chucks 24 are threaded and pass through suitable apertures in the flange 40 and are secured in place by means of the lock nuts 46. The right ends of the segments 21, 22 and 23 are also vulcanized to their respective air chucks 25 and each of these chucks are also provided with integral flanges 47. The right ends of the segments 21, 22 and 23 are secured to the belt 10 in the same manner as the left ends as by means of the angle bracket generally indicated by the numeral 48. The bracket 48 includes the outwardly extended flange 49 which is provided with a plurality of suitable apertures through which the outer ends of the air chucks 25 pass and are secured in place by means of the lock nuts 50. The other flange 51 of the bracket 48 is fixedly secured to the belt 10 by any suitable means as by the rivets similar to the rivets 44.

The carbon dioxide or compressed air is passed into the segments 21, 22 and 23 by means of the master valve 52. The master valve 52 is shown in FIGS. 3 and 8 and comprises the body portion 53 having the three outlets 54, 55 and 56 which are connected to the chucks 25 of the expandable segments 21, 22 and 23, respectively. The master valve 52 has a fourth outlet 57 which is connected by means of the suitable flexible tubing 58 to a conventional portable carbon dioxide cylinder 59. The carbon dioxide cylinder 59 is provided with the usual release valve 60 operable by the pull cord 61. The cylinder 59 is provided with the L-shaped mounting bracket 62 which is adapted to be normally engaged over the belt as shown in FIG. 6.

When the safety device of the present invention is worn by a person, it is mounted in the manner shown in FIG. 2 and the bracket 62 may be passed through the holes 63 and 64 in the buckles 19 and 20, respectively, to secure the ends of the belt together. The safety device of the present invention may also be mounted across the seat 65 of an automobile as shown in FIG. 1. When mounted for use as a combination safety belt and collision shield as shown in FIG. 1, the buckles 19 and 20 will be suitably secured to the hook member 66 and 67 which may be mounted on the insides of the doors of the vehicle as shown in FIG. 1. The numeral 68 in FIG. 1 illustrates an additional hook which may be placed on the floor of the vehicle beside the seat 65 in case the occupant wishes to hook the belt across his legs and attach the belt to the floor of the car instead of to the door of the car.

In the use of the segment safety device of the present invention, the zipper 18 would be open and the ends 14 and 16 of the front strip free so that the front strip 11 could be laid back to expose the segments 21, 22 and 23. If the safety device is being used as shown in FIG. 1 of the car, the carbon dioxide cylinder 59 may be disposed on the floor of the car with the pull string 61 in a vicinity adjacent the occupant of the seat 65. If the occupant of the seat 65 is disposed in a position where he can easily grasp the pull string 61, it will be obvious that in the event of an accident or collision, the occupant can pull the string 61 to inflate the segments 21, 22 and 23 and provide a collision shield to protect the body of the occupant. The segments 21, 22 and 23 will expand outwardly, upwardly and downwardly so as to provide a collision shield between the occupant and the dashboard of the vehicle. If the user of the safety device of the present invention is riding in a boat, then such user could carry the device around his shoulders as shown in FIG. 2 and instantly make the device operative by pulling the release cord 61 in the aforedescribed manner. After the safety device has been used, the compressed air or carbon dioxide inside the segments 21, 22 and 23 can be easily released by means of the air cores or valves 27 and the chucks 24. While a pressure cartridge or carbon dioxide cylinder 59 has been shown as a means for releasing cushioning fluid under pressure to the segments 21, 22 and 23, it will be understood that fluid under pressure may be supplied from other sources, and further, the release of the fluid under pressure may be released by automatic means responsive to conditions of the operation of the vehicle, if the device is mounted in a vehicle.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A safety device, comprising: an elongated belt; attachment means at each end of said belt for securing the belt in place; a bracket on each end of said belt; a plurality of individually formed, elongated inflatable cushioning members having the ends thereof secured to the brackets mounted on the outer face of the belt and extended lengthwise thereof; and, means for inflating said cushioning means.

2. A safety device, comprising: an elongated belt; attachment means at each end of said belt for securing the belt in place; a bracket on each end of said belt; a plurality of individually formed, elongated inflatable cushioning members having the ends thereof secured to the brackets mounted on the outer face of the belt and extended lengthwise thereof; a first valve means at one end of each of said cushioning members for admitting fluid under pressure into said cushioning members; a second valve means at the other end of each of said cushioning members for exhausting fluid under pressure from said cushioning members; and, means for inserting fluid under pressure into said cushioning members for inflating the same.

3. A safety device as defined in claim 2, wherein: said first valve means comprises an air chuck fixedly mounted in said one end of each of said cushioning members and having a passageway formed therethrough; an expandable tube being open at the ends thereof and being fixedly mounted in said passageway; and, a plug fixedly mounted in said tube, whereby when fluid under pressure is inserted into said passageway it will flow into said tube and expand the same to admit the fluid under pressure to pass around said plug.

4. A safety device as defined in claim 2, including, a cover means for enclosing said plurality of inflatable cushioning members.

5. A safety device as defined in claim 3, wherein each of said cushioning members is provided with an internally disposed elongated rope which is longer than the inflatable member when the inflatable member is in a relaxed position.

References Cited in the file of this patent

UNITED STATES PATENTS

| | | |
|---|---|---|
| 731,314 | Malmqvist | June 16, 1903 |
| 1,045,404 | Hottenroth | Nov. 26, 1912 |
| 1,256,594 | Rodal | Feb. 19, 1918 |
| 2,313,151 | Johnson | Mar. 9, 1943 |
| 2,760,212 | Gazelle | Aug. 28, 1956 |
| 3,049,736 | Toulmin | Aug. 21, 1962 |